UNITED STATES PATENT OFFICE.

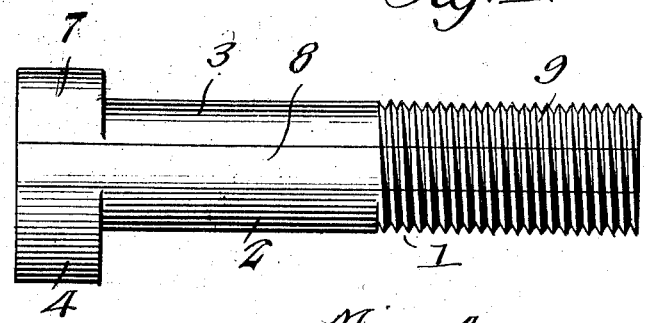
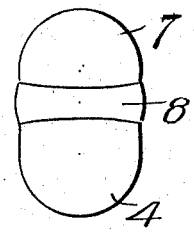
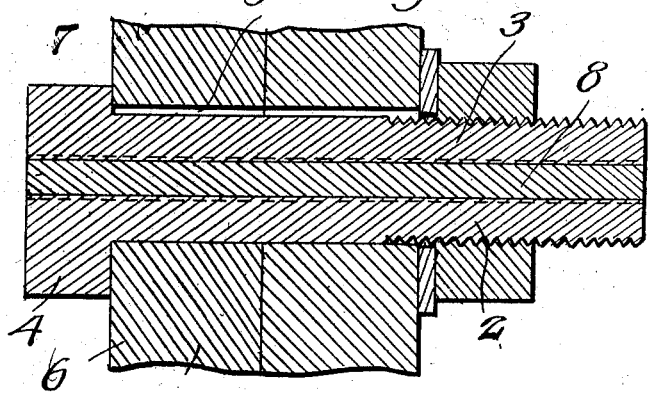
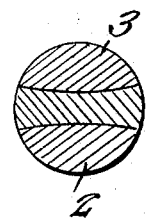
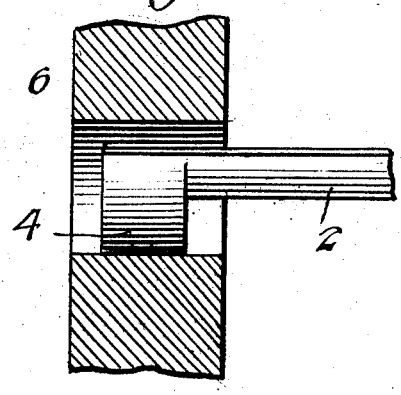
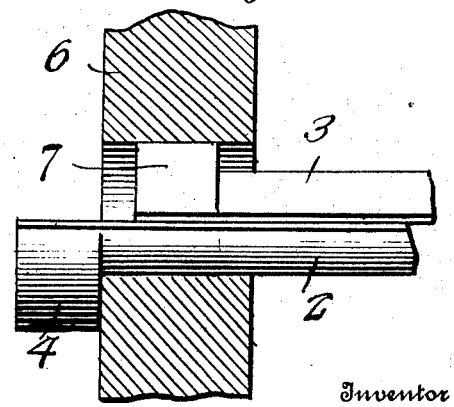

WILLIAM GOULD, OF AUSTIN, OREGON.

BOLT.

1,087,759.  Specification of Letters Patent.  Patented Feb. 17, 1914.

Application filed May 13, 1913. Serial No. 767,321.

*To all whom it may concern:*

Be it known that I, WILLIAM GOULD, a citizen of the United States, residing at Austin, in the county of Grant and State of Oregon, have invented new and useful Improvements in Bolts, of which the following is a specification.

This invention relates to bolts and has for its chief object to provide a bolt which may be inserted head first through the bolt hole in a metal plate or the like object, and which is adapted especially for use in boiler constructions or other places wherein it is inconvenient or impossible to insert the bolt through the opening in the usual manner, such as in a case where one of a pair of narrowly spaced members is provided with an opening for the reception of a bolt which is longer than the space between the members.

A further object of the invention is to provide a bolt of this character which includes a pair of longitudinally split sections provided with head portions adapted to be inserted individually through the bolt hole in the member to which the bolt is to be applied, and a spacing member adapted to be positioned between the said sections prior to the application of a nut to the threaded ends of the same.

A still further object is to provide a bolt of the construction set forth wherein the head portions of the split sections will have a maximum area of engaging surface.

Another object is the provision in a bolt of this character of a spacing member which has its exterior faces threaded so that the nut for the bolt will serve to secure the said member against longitudinal movement with respect to the split sections.

The invention consists in the features of construction, combination and arrangement of parts, hereinafter fully described and claimed, reference being had to the accompanying drawing, in which:

Figure 1 is a side elevation of the bolt showing its parts assembled; Fig. 2 is a front elevation of the head of the bolt; Fig. 3 is a transverse sectional view of the shank of the same; Fig. 4 is a longitudinal sectional view through the bolt and a member to which the same is applied; Fig. 5 is a transverse sectional view through a perforated member showing one section of the bolt in side elevation during the act of inserting its head portion through the bolt hole; and, Fig. 6 is a similar view showing the first section in applied position and the coacting section in the act of inserting its head portion through the unobstructed portion of the bolt hole.

In the drawing, the numeral 1 designates the bolt which is split longitudinally to provide the companion sections 2 and 3. The section 2 is provided upon one end thereof with an enlarged head portion 4 which projects laterally therefrom and is constructed just thick enough to permit its insertion through a bolt hole such as that indicated by the numeral 5 in the member 6, which may represent a board or metal plate, without binding therein. In order to facilitate this insertion, as is shown in Fig. 5, the outer side face of the head portion of this bolt section is constructed convex and the inner face of the bolt section as a whole is constructed slightly convex also. The companion section 3 is provided with an enlargement 7 on one end thereof which projects laterally to form a head portion of less thickness than the head portion of the section 2 so that it may be inserted with comparative ease through the unobstructed portion of the bolt hole 5 after the first-named section has been completely applied within the said hole, as is shown particularly in Fig. 6. The bolt section 3 has the outer side face of its portion 7 formed convex, as well as the inner face of this section as a whole, so that the insertion of the bolt into applied position within the bolt hole may be facilitated, and also for a further purpose which will be presently described.

A spacing member 8 equal in width and length to the bolt sections previously described is adapted to be inserted longitudinally between the said bolt sections, after the application of the same within the bolt hole has been completed, the opposite, wide faces of the spacing member being constructed concave for even engagement with the adjacent convex faces of the bolt sections, this arrangement of faces serving to prevent lateral displacement of the spacing member, after its initial application. The end portion of the bolt, as a whole, opposite to its composite head, is externally screw threaded as at 9, these threads being formed in the spacing member likewise, so that longitudinal movement of the latter, with respect to the companion bolt sections, will be prevented after a suitable nut (not shown) has been applied thereto.

From the foregoing description, taken in connection with the accompanying drawing, it should be apparent that I have provided a simply constructed and readily operable bolt which will be of maximum strength and durability, and which will be a time and labor saving device when used in the capacity for which it is intended.

Having thus described my invention, what I claim is:

A bolt of the class described comprising longitudinally split sections including threaded shank portions and oppositely projecting, alined head portions, and a spacing member adapted to be inserted between the said sections, the adjacent faces of the respective bolt sections and spacing member being oppositely curved.

In testimony whereof I affix my signature in presence of two witnesses.

WILLIAM GOULD.

Witnesses:
 LUKE T. JONES,
 HENRY KRAMENBARD.

Copies of this patent may be obtained for five cents each, by addressing the "Commissioner of Patents, Washington, D. C."